United States Patent Office 3,637,611
Patented Jan. 25, 1972

3,637,611
NOVEL ALTERNATING COPOLYMER OF MULTI-SUBSTITUTED CONJUGATED VINYL COMPOUND AND UNSATURATED COMPOUND AND PROCESS FOR PRODUCING SAME
Kenji Takeya, Yoshihiro Uno, and Akira Yamane, Okayama, Japan, assignors to Sumitomo Chemical Company, Ltd., and Japan Exlan Company Ltd., both of Osaka, Japan
No Drawing. Filed Mar. 20, 1970, Ser. No. 21,475
Claims priority, application Japan, Mar. 26, 1969, 44/23,424
Int. Cl. C08f 1/28, 15/38, 19/16
U.S. Cl. 260—78.5 N        17 Claims

ABSTRACT OF THE DISCLOSURE

A novel alternating copolymer composed of the group (B) monomer consisting of at least one $\alpha$-, $\beta$- or $\alpha,\beta$-multisubstituted conjugated vinyl compound, and the group (A) monomer consisting of at least one monomer selected from the group of olefins, haloolefins, internal olefins, polyenes, acetylenes, and carbonyl compounds or thiocarbonyl compounds; the units from the group (A) monomer always alternating with the units from the group (B) monomer. Said alternating copolymer is produced by contacting at least the group (B) monomer of the two groups with an organoaluminum or organoboron halide to form a complex and then contacting the remaining monomer with the complex formed. When monomers of both groups (A) and (B) are properly chosen, said novel alternating copolymer can be useful as a material for the production of film, fiber and molded articles, and as an additive for the plastics processing.

---

The present invention relates to a novel alternating copolymer of a multi-substituted conjugated vinyl compound and an unsaturated compound and a process for producing the same. More particularly, this invention relates to a novel alternating copolymer of an $\alpha$-, $\beta$- or $\alpha,\beta$-multi-substituted conjugated vinyl compound and an unsaturated compound such as olefin, haloolefin, internal olefin, polyenic compound, acetylenic compound, carbonyl- or thiocarbonyl-containing compound, and to a process suitable for producing said alternating copolymer.

There has already been proposed in Japanese patent publication No. 18,712/68 a process for producing a copolymer comprising an $\alpha$- or $\beta$-substituted conjugated vinyl compound (hereinafter referred to as group [B] monomer) having the formula,

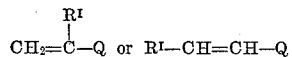

wherein $R^I$ is a nonpolymerizable hydrocarbon radical having 1 to 20 carbon atoms, a halogen-containing nonpolymerizable hydrocarbon radical or a halogen atom (including a derivative thereof having other inert substituents), and Q is a nitrile group or a

group in which Y is ZH, $ZR^{II}$, ZMe, $NR^{III}R^{IV}$, $R^{II}$, a halogen atom, or a hydrogen atom, where Z is an oxygen atom or a sulfur atom; $R^{II}$ is a common organic radical having 1 to 20 carbon atoms; $R^{III}$ and $R^{IV}$ each or both are hydrogen atoms or common organic radicals (including the case where $R^{III}$ and $R^{IV}$ are bonded to each other at a position other than the nitrogen atom); and Me is an ammonium radical or the monovalent portion of an element of Groups I to III of Mendeleev's Periodic Table, and an unsaturated compound (hereinafter referred to as group [A] monomer) such as a terminally unsaturated olefin, haloolefin, internal olefin and unsaturated ester of carboxylic acid. In this copolymerization reaction (hereinafter referred to as complex polymerization), there has been used as the catalyst component an organoaluminum or organoboron halide, a mixture thereof with a halogen compound of aluminum or boron, or a combination of an organic compound of the metal of Group IIb, IIIb or IVb of Mendeleev's Periodic Table and a halogen compound of the metal of Group IIIb or IVb of the same table. An outstanding feature of said copolymerization reaction is the selective formation of an alternating copolymer.

However it has been extremely difficult to effect with said complex polymerization catalyst a copolymerization reaction between the group [A] monomer and a conjugated monomer, such as vinylidene cyanide, a fumaric acid derivative, or a maleic acid derivative, in which both of the double bonded carbon atoms bear a polar group that exerts a marked influence upon the polymerization reaction.

As a result of further investigations upon the complex polymerization, the present inventors have now found that as the group [B] monomer there may be used not only monomers having inert substituents at $\alpha$- or $\beta$-position such as methacrylonitrile, methacrylic acid derivatives, or crotonic acid derivatives, but also the conjugated monomers having polar groups, such as a cyano group, an ester group, or an amide group at $\alpha$-, $\beta$- or $\alpha,\beta$-position, with the intervening specific alkylene group.

The present invention is based upon said findings.

An object of the present invention is to provide a novel alternating copolymer of a multi-substituted conjugated vinyl compound and an unsaturated compound.

Another object of the present invention is to provide an alternating copolymer comprising at least one of the group [A] monomers known in the art and at least one multi-substituted conjugated vinyl compound as the group [B] monomer.

A further object of the present invention is to provide a process for producing said novel copolymer.

According to the present invention there is provided an alternating copolymer composed of at least one monomer selected from the group [A] monomer consisting of (1) terminally unsaturated olefinic compounds having the formula,

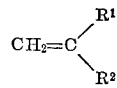

wherein $R^1$ and $R^2$ are hydrogen atoms, halogen atoms or hydrocarbon or halogen-containing hydrocarbon radicals having 1 to 20 carbon atoms,
(2) internally olefinic compounds having the formula,

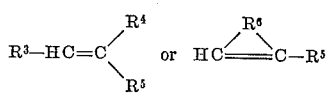

wherein $R^3$ and $R^4$ are hydrocarbon or halogen-containing hydrocarbon radicals having 1 to 20 carbon atoms, $R^5$ is a hydrogen atom or a hydrocarbon or halogen-containing hydrocarbon radical having 1 to 20 carbon atoms, $R^6$ is a divalent hydrocarbon or halogen-containing hydrocarbon radical having 1 to 20 carbon atoms,
(3) polyenic compounds having up to 30 carbon atoms and containing at least one carbon-carbon double bond having at least two hydrogen atoms attached thereto,
(4) acetylenic compounds having the formula,

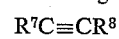

wherein $R^7$ is a hydrogen atom or a hydrocarbon or halohydrocarbon radical having 1 to 20 carbon atoms, and $R^8$ is a hydrogen atom or a hydrocarbon or halohydrocarbon radical having 1 to 20 carbon atoms and containing a polymerizable unsaturated group, and (5) carbonyl- or thiocarbonyl-containing compounds having the formula,

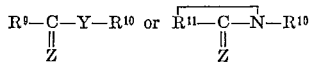

wherein $R^9$ is $R^{12}$—, $R^{12}O$—, $R^{12}S$— or $R^{13}R^{14}N$— group; Z is an oxygen or sulfur atom; Y is an oxygen atom, a sulfur atom or —$NR^{15}$ group; $R^{10}$ is a hydrocarbon or halohydrocarbon radical having 2 to 20 carbon atoms and containing a polymerizable unsaturated group; $R^{11}$ is a divalent organic radical having 1 to 20 carbon atoms; $R^{12}$ is a hydrocarbon or halohydrocarbon radical having 1 to 20 carbon atoms; and $R^{13}$, $R^{14}$ and $R^{15}$ are hydrocarbon or halohydrocarbon radicals having 1 to 20 carbon atoms, and at least one monomer selected from the group [B] monomer consisting of multi-substituted conjugated vinyl compounds having the formula,

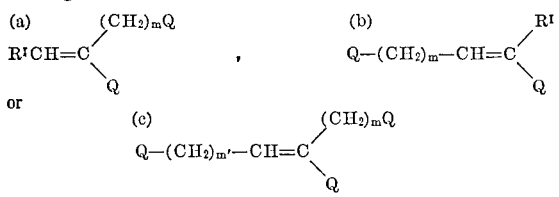

wherein $R^I$ is a hydrocarbon or halogen-containing hydrocarbon radical having 1 to 20 carbon atoms, a halogen atom or a hydrogen atom, and Q is a nitrile group or a

group, in which $Y^I$ is ZH, $ZR^{II}$, ZMe, $NR^{III}R^{IV}$, $R^V$, a halogen atom or a hydrogen atom, where Z is an oxygen or sulfur atom; $R^{II}$ and $R^V$ each is an organic radical having 1 to 20 carbon atoms; $R^{III}$ and $^{IV}$ are hydrogen atoms or organic radicals having 1 to 20 carbon atoms (including the case where $R^{III}$ and $R^{IV}$ are bonded to each other at a position other than the nitrogen atom); Me is an ammonium radical or the monovalent portion of an element of Groups I to III of Mendeleev's Perodic Table; and m and m' are 1 or 2; said alternating copolymer having a structure such that monomer units from group [A] always alternate with monomer units from group [B].

Said alternating copolymer is produced by (1) contacting at least one monomer selected from the abovementioned group [A] monomers and at least one monomer selected from the above-mentioned group [B] monomers with an organometallic halogen compound having the formula, $MR'_nX_{3-n}$, wherein M is aluminum or boron; R' is an ordinary organic radical; X is a halogen atom; and n is an arbitrary value of from 1 to 2 or a mixture of at least two compounds selected from the group consisting of compounds having the formula, (a) $MR'_mX_{3-m}$, (b) $M'R''_3$, and (c) $M''X'_3$, wherein M, M' and M'' are aluminum or boron, R' and R'' are ordinary organic radicals, X and X' are halogen atoms, and n is an arbitrary value of from 1 to 2; or (2) mixing and contacting in the presence of at least the group [B] monomer (a') an organometallic compound of a metal of Group IIb, IIIb or IVb of Mendeleev's Periodic Table with (b') a halogen compound of a metal of Group IIIb or IVb of said Periodic Table (at least one of (a') and (b') being an aluminum compound or a boron compound), to form a complex of the conjugated monomer coordinated with an organometallic halide, and then contacting the remaining monomer with said complex. In this process the co-polymerization can be effected, if required, in the presence of at least one compound selected from the group consisting of oxygen, organic peroxides, and compounds of transition metals, such as compounds of metals of the IVa~VIIa and VIII Groups of Mendeleev's Periodic Table.

It was heretofore well known that $\alpha$-, $\beta$-, or $\alpha,\beta$- multi-substituted conjugated vinyl monomers having the formula,

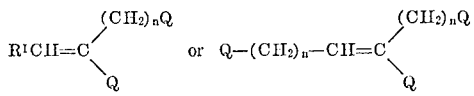

are polymerized or copolymerized with common vinyl compounds in most cases in the presence of a free radical initiator. Some compounds belonging to the group [A] monomer used in the present invention are also known to be susceptible to a free radical polymerization and copolymerization. On the other hand, said conjugated vinyl monomer is polymerized or copolymerized with a catalyst system comprising a trialkyl boron or a trialkyl aluminum, and oxygen or an organic peroxide added thereto. Alternatively, they can be polymerized or copolymerized with a catalyst comprising a certain combination of an organometallic compound and a metal halide, particularly a halogen compound of nontransition metals. However, the polymerization mentioned above is generally recognized as a radical polymerization, and this is proved by the fact, for example, that the relationship of the monomer composition to the polymer composition in the copolymerization coincides completely with that in the polymerization with a radical catalyst, such as a peroxide or the like. Consequently, a random copolymer is generally produced from such a polymerization system.

Now, the present inventors have unexpectedly found that an alternating copolymer can be obtained by use of a certain specific catalyst and a certain specific combination of monomers. It has been quite unforseen that alternating copolymers can be obtained from the present specific combinations of monomers including such a common combination that the production of a copolymer therefrom has never been known or even such a monomer combination that the formation of a random copolymer has been known therefrom. Such alternating copolymers are quite novel compounds.

Moreover, in the complex polymerization process according to the present invention for producing alternating copolymers of the group (A) monomer and the group (B) conjugated monomer, a multicomponent alternating copolymer is obtained when the group (A) monomer comprises two or more monomers, or the group (B) monomer comprises two or more monomers, or even when the group (A) monomer and the group (B) monomer both comprise two or more monomers, i.e. four or more monomers in total are used. In the multicomponent copolymerization under the conditions for producing an alternating copolymer, the group (A) monomer is generally copolymerized alternately with the group (B) monomer. For instance, when two monomers of group (B) and one monomer of group (A) are copolymerized, a terpolymer is obtained, in which the total content of the group (B) monomer is always 50 mole percent. In this case the ratio of two monomers of the group (B) to each other in the copolymer can be varied at will because this ratio depends on the ratio of the two monomers used, whereby any copolymer can be obtained by selecting a suitable ratio of the two.

Similarly, it is also possible to obtain a multicomponent alternating copolymer of at least one monomer of the group (A), at least one monomer of the group (B) and at least one monomer of the group (B') having the formula:

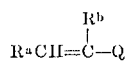

wherein $R^a$ and $R^b$ each is a hydrogen atom, a halogen atom or a hydrocarbon or halohydrocarbon radical having 1 to 20 carbon atoms, at least one of $R^a$ and $R^b$ being a hydrogen atom; and Q is a nitrile or

group, wherein Y' is a halogen atom, or a $Z'R^c$, $Z'Me$, $NR^dR^e$ or $R^c$ group in which Z' is an oxygen atom or a sulfur atom; $R^c$, $R^d$ and $R^e$ each is a hydrogen atom or an organic radical having 1 to 20 carbon atoms, including the case where $R^d$ and $R^e$ are bonded directly to each other; and in which Me is an ammonium radical or the monovalent portion of an element of Groups I to III of Mendeleev's Periodic Table; said interpolymer having a structure such that monomer units from group (A) are linked only to the monomer units from group (B) or (B'), and monomer units from group (B) and (B') are linked only to the monomer units from group (A).

It has been known in the art that a special combination of monomers can afford an alternating copolymer by free radical polymerization. Examples are combinations of maleic anhydride, maleimide, fumaroyl chloride, or the like, with styrene, α-methylstyrene, or the like. Several other similar combinations are also known. However, a characteristic behavior common to these known combinations which can give alternating copolymers, is that they are unable to or hardly able to yield random copolymers even when the conditions are varied. On the other hand, it has heretofore been impossible to obtain an alternating copolymer from the combination of monomers which produces a random copolymer. In this respect too, the present invention has a great significance.

On the other hand, in Japanese patent publication No. 18,712/68, as mentioned above, a conjugated vinyl compound having the formula,

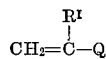

or $R^1$—CH=CH—Q, is referred to as the group (B) monomer which is entirely different from the group (B) monomer of the present invention. The group (B) monomer of the present invention is a conjugated vinyl monomer having 2 or 3 polar groups as substituents, and the unsaturated bond of one of the polar groups should be in the conjugated position with reference to the vinyl group, and the remaining 1 or 2 polar groups should be attached over an interposing specific alkylene group (e.g. methylene or ethylene group) to the carbon atom bearing a double bond.

It has generally been considered difficult to copolymerize a conjugated vinyl monomer having multiple polar groups, which is the group (B) monomer of the present invention, with the group (A) monomer by use of the present catalyst system comprising an aluminum or boron atom, an organic radical, and a halogen atom, because of the difficulty encountered in copolymerizing a conjugated monomer such as vinylidene cyanide, a fumaric acid derivative, or a maleic acid derivative, with the group (A) monomer in the presence of said catalyst system. Such a difficulty seems to be caused by the formation of a stable coordination complex or charge transferring complex between the catalyst components and the multiple polar groups of the conjugated vinyl monomer used as the group (B) monomer, or by the steric hindrance of multiple polar groups.

However, the present inventors have found that a conjugated vinyl monomer with multiple polar groups may be used as the group (B) monomer when said polar groups are attached over an interposing specific alkylene group to the carbon atom bearing a double bond. This is one of the important characteristics of the present invention.

As mentioned before, an alternating copolmyer can be produced by the process of this invention only when a combination of the group (A) monomer and the group (B) monomer is used. This is also one of the important characteristics of the present process, and no alternating copolymer is obtainable from a combination of monomers belonging to the same group (A) or (B).

In the present process, alternating copolymerization cannot proceed with all catalyst components. In the present process the coexistence of a metal, specifically aluminum or boron, an organic group and a halogen is necessary. Therefore, no alternating copolymer can be obtained with, for example, only a trialkylaluminum or a boron halide. This is another characteristic of the present process.

A further characteristic of the present process is that a metallic compound is coordinated with the group [B] monomer. It is particularly important that a halogen-containing metallic compound is coordinated with the group [B] monomer. The alternating copolymerization is considered to proceed through such a coordination complex. This is an important factor for producing an alternating copolymer.

The peculiarity of the present process is that, as mentioned above, the coexistence of a metal, an organic group and a halogen is necessary, the combination of monomers is limited, and, in addition, the use of a polar solvent or the presence of polar substances is not desired in the above alternating copolymerization, though in the conventional free radical polymerization reaction, the polarity of a solvent usually does not essentially affect the polymerization reaction. Substances capable of forming a complex with metallic components used in the present process are particularly unsuitable. For example, ethers such as ethyl ether, tetrahydrofuran and dioxane, ketones such as acetone, esters, nitriles and dimethyl-formamide cannot be used to that effect. Alcohols and water are also unsuitable.

Further, in the present process, the presence of oxygen, an organic peroxide or a transition metal salt accelerates the polymerization, and enables the polymerization to effectively proceed with a relatively small amount of the catalyst. However, the alternating copolymer cannot, of course, be obtained by merely adding oxygen, an organic peroxide or a transition metal salt to a mixture of the group [A] monomer and the group [B] monomer. Moreover, as mentioned above, no alternating copolymer can be obtained even with a catalyst system consisting of a trialkylboron or a trialkylaluminum and oxygen or an organic peroxide added thereto. That is, the present process is quite different from the heretofore known radical polymerization with an organometallic compound.

The terminally unsaturated olefinic compounds used in the present process as the first group of the group (A) monomer have the formula,

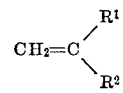

Halogens used for $R^1$ and $R^2$ are chlorine, bromine, iodine, or fluorine. Hydrocarbon and halogen-containing hydrocarbon radicals used for $R^1$ and $R^2$ are preferably alkyl, aryl, aralkyl, alkylaryl, cycloalkyl, and these radicals substituted with halogens, and derivatives thereof.

As the examples of such compounds there are olefins such as ethylene, propylene, butene-1, isobutene, hexene-1, heptene-1, 2-methyl-butene - 1, 2 - methyl - pentene - 1, 4-methyl-pentene-1, octadecene-1,4-phenyl - butene - 1, styrene, α-methylstyrene, α-butylstyrene, p-methylstyrene, vinylcyclobutane, vinylcyclohexane, isopropenylbenzene, vinylnaphthalene, and allylbenzene; and halogen-containing olefinically unsaturated compounds such as vinyl chloride, vinyl bromide, allyl chloride, allyl bromide, allyl iodide, 4-chlorobutene-1, 3 - chlorobutene - 1, 3 - bromopentene-1, p-chlorostyrene, p-iodostyrene, 4-chloro-vinyl-cyclohexane, p - chloroallylbenzene, 2,4 - dichlorostyrene, 2,4-difluorostyrene, 4-chloro - 1 - vinylnaphthalene, vinylidene chloride, vinylidene bromide, 2-chloropropene-1, 1- bromo-1-chloroethylene, 2-chloroallyl chloride, methallyl chloride, 1,1-bis(p-chlorophenyl)ethylene.

As the second group of the group [A] monomers, i.e. internally olefinic compounds, there are used, as is clear from the formulas shown before, 1,2-disubstituted or 1,2,2-trisubstituted ethylenically unsaturated hydrocarbons or halogen-containing unsaturated hydrocarbons, including acyclic olefins and cyclic olefins.

Preferable hydrocarbon radicals for $R^3$ and $R^4$ in the general formula are alkyl, aryl, aralkyl, alkylaryl, and cycloalkyl. For $R^5$, a hydrogen atom or said hydrocarbon radicals are preferable. For $R^6$, divalent radicals corresponding to said hydrocarbon radicals are preferable.

As the compounds having the formula,

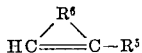

there are used, in addition to monocyclic compounds, polycyclic compounds and bridged ring compounds.

Examples of the above compounds are: butene-2, 2-methylbutene-2, hexene-2, hexene-3, 2-methylpentene-2, heptene-2, octadecene-2, γ-methallyl chloride, 1,5-dichloropentene-2, 1-chloro - 3 - methylbutene-2, 1 - chloromethylbutene-2, β-methylstyrene, 4-phenylbutene-2, α,β-dimethylstyrene, β,β-dimethylstyrene, 1,1 - diphenylpropene - 1, stilbene, α - methylstilbene, α - methyl-p-chlorostyrene, α-chloromethylstyrene, α-propenylnaphthalene, 1-cyclohexylpropene - 1, cyclopentene, cycloheptene, 1-methylcyclobutene-1, 4-chlorocyclohexene, indene, β-bromonindene, 3-methylindene, dihydronaphthalene, acenaphthylene, norbornene, 5-methylnorbornene, 5-phenylnorbornene, 5-chloronorbornene, 5,6-dichloronorbornene, 7-chloronorbornene, 2-methylnorbornene, γ-fenchene, bornylene, 5 - chloromethylnorbornene, endocamphene, α-pinene, myrcenyl chloride, etc.

As the third group of the group (A) monomers, may be cited polyolefinic compounds such as dienes, trienes, and tetraenes, which, however, should contain at least one carbon-carbon double bond having at least two hydrogen atoms attached thereto. Said polyolefinic compounds can be hydrocarbons as well as substituted hydrocarbons with halogen or substitutents having no inhibitive effect on the polymerization.

Examples of the above compounds are 1,3-butadiene, isoprene, 1,3-pentadiene, 1,4-pentadiene, 1,4-hexadiene, 1,5-hexadiene, 2,3-dimethyl-1,3-butadiene, 11-ethyl-1,11-tridecadiene, myrcene, 1,3,5-hexatriene, 2-chloro-1,3-butadiene, 3-fluoro-1,4-hexadiene, p-divinylbenzene, p-isopropenylstyrene, diallylcyclohexane, trivinylcyclohexane, 4-vinylcyclohexene-1, 2-methylallylcyclopentene-1, 3-allylindene, 4,7,8,9-tetrahydroindene, bicyclo(4,2,0)octadiene-2,7, fulvene, 1,3-cyclopentadiene, 5-chloro-1,3-pentadiene, 1,5-cyclooctadiene, 1,3,5-cycloheptatriene, Δ2,2(-dicyclopentenyl, dicyclopentadiene, 2,5-norbornadiene, 5-methylene-2-norbornene, 5-vinyl-2-norbornene, 5-isopropenyl-2-norbornene, 2-vinyl-1,4-endomethylene-1,2,3,4,5,5a,8,8a-octahydronaphthalene, limonene, dipentene, etc.

The fourth group of the group (A) monomer is an acetylenic compound, $R^7C \equiv CR^8$. $R^7$ is a hydrogen atom or a hydrocarbon radical having 1 to 20 carbon atoms or a substituted derivative thereof. Examples of said radical are saturated or unsaturated hydrocarbon radicals, such as alkyl, alkenyl, alkinyl, aryl, aralkyl, alkylaryl, alkenylaryl, cycloalkyl, and cycloalkenyl, and substituted derivatives of these radicals with chlorine or other inert substituents. $R^8$ is a hydrogen atom or a polymerizable hydrocarbon radical having 1 to 20 carbon atoms or a substituted derivative thereof with chlorine or other inert substituents, such as those having a double bond of the vinyl-, vinylidene-, or vinylene-type. Examples of suitable acetylenic compounds are acetylene, methylacetylene, ethylacetylene, 1-hexyne, phenylacetylene, cyclohexylacetylene, vinylacetylene, divinylacetylene, hexene-1-yne-4, butenylmethylacetylene, allylethylacetylene, allylcyclohexylacetylene, allyl-(p-chlorophenyl)-acetylene, etc.

The fifth group of the group (A) monomer is a carbonyl- or thiocarbonyl-containing compounds having the formula,

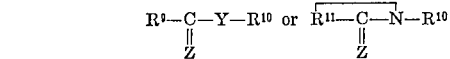

wherein $R^9$ is $R^{12}$—, $R^{12}O$—, $R^{12}S$—, or $R^{13}R^{14}N$—; and $R^{12}$, $R^{13}$ and $R^{14}$ are hydrocarbon radicals such as alkyl, aryl, aralkyl, alkylaryl, cycloalkyl, and bridged ring hydrocarbon residue. The term "substituted radical" or "substituted derivative" means a hydrocarbon radical or its derivative having the substituent that will not inhibit the copolymerization reaction. As such an inert substituent, chlorine is frequently used in the present process. Y is an oxygen atom, a sulfur atom, or —$NR^{15}$— group. For $R^{15}$, the same applies as for $R^{13}$ and $R^{14}$ mentioned above. Z is an oxygen atom or a sulfur atom. $R^{10}$ is a hydrocarbon radical having 2 to 20 carbon atoms, which contains a polymerizable unsaturated group such as preferably vinyl group or vinylidene group, though vinylene group is sometimes used. The vinyl group is most frequently used and $R^{10}$ is often the vinyl group itself. Further, allyl group and isopropenyl group are often used. As a substitutent for said hydrocarbon radical, halogen is particularly used. A substituent containing a hetero atom that will not inhibit the polymerization reaction can be used unless said substituent is introduced into the hydrocarbon radical so that said hetero atom is in the conjugated position with reference to the carbon-carbon double bond of the radical. $R^{11}$ is a divalent organic radical having 1 to 20 carbon atoms, which is a hydrocarbon residue or a residue containing a hetero atom such as oxygen, sulfur, and nitrogen atoms in particular. For example, the cyclic structure of the formula given above may contain such linkage as >C=O, >C=S, —O—, —S—, or >N—R. A polycyclic structure is also possible. In short, all the non-conjugated unsaturated compounds mentioned above have in common the grouping,

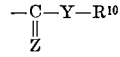

in their molecular structure. The reactivity of each compound having said grouping is quite similar to each other, and is almost independent of the structure in other part of the molecule. Examples of O-unsaturated compounds and S-unsaturated compounds are unsaturated esters of carboxylic acids, thiolcarboxylic acids, thioncarboxylic acids, and dithiocarboxylic acids; carbonates, thiolcarbonates, thioncarbonates, dithiocarbonates, trithiocarbonates, carbamates, thiolcarbamates, thioncarbamates, dithiocarbamates, etc. Examples of N-unsaturated compounds are carboxylic acid amides, thiolcarboxylic acid amides, carbamates, thiolcarbamates, thioncarbamates, dithiocarbamates, urea derivatives, thiourea derivatives, N-unsaturated cyclic amides, etc.

The N-unsaturated cyclic amide is a compound having the formula,

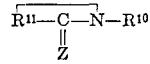

such as, for example, a lactam, a dicarboxylic acid imide, a dithiocarboxylic acid imide, an oxazolidone, an alkyleneurea, an alkylenethiourea, etc.

Said compounds can be substituted derivatives with halogen and other substituents.

Examples of individual compounds of the fifth group are vinyl formate, vinyl acetate, vinyl propionate, vinyl pelargonate, vinyl 2-ethyl-hexanecarboxylate, vinyl stearate, ethyl vinyl oxalate, vinyl chloroacetate, vinyl thiolacetate, vinyl benzoate, vinyl cyclohexanecarboxylate, vinyl norbornene-2-carboxylate, allyl acetate, allyl laurate, allyl cyclobutanecarboxylate, 2-chloro-allyl acetate, isopropenyl acetate, α-methylallyl acetate, 1-propenyl acetate, 1-isobutenyl butyrate, methyl vinyl carbonate, S-ethyl-O-vinyl-thiolcarbonate, O-cyclohexyl-O-vinylthioncarbonate, phenyl vinyl trithiocarbonate, O - vinyl - N,N - dimethylcarbamate, S - vinyl - N,N - diethylthiolcarbamate, O-allyl - N,N - dimethylthioncarbamate, S-isopropenyl - N,N - diethyldithiocarbamate, N-vinylacetamide, N - allyl - N - methylpropionamide, N-vinylbenzamide, N-vinylthioacetamide, N - vinylurethane(N-vinyl-O-ethylcarbamate), N-ethyl - N - vinylmethylcarbamate, N-vinyl-S-phenylthiolcarbamate, N - vinyl-O-ethylthioncarbamate, N-vinyl - N - ethyl-S-ethyldithiocarbamate, N-vinyl-N-methyl - S - ethylthiolcarbamate, N - ethyl-N'-vinylurea, N,N-diethyl - N' - vinyl-N'-ethylurea, N-phenyl-N'-vinyl-thiourea, N-vinylcarbamylchloride, N - vinyl-N-ethylthiocarbamylchloride, N-vinylpyrrolidone, N-vinylpiperidone, N-vinylcaprolactam, N-vinylsuccinimide, N-vinylphthalimide, N - allylsuccinimide, N - isopropenylsuccinimide, N-isopropenylphthalimide, N-vinyloxazolidinone, N-allyl-5-methyloxazolidinone, N-vinyldiglycolylimide, N-vinyl-ethyleneurea, N-ethyl-N-vinylpropyleneurea, N-vinylethylenethiourea, etc.

The group [A] monomer used in the present invention, disclosed in detail in the preceding paragraphs, has generally a small $e$-value, according to the Price-Alfrey concept of monomer reactive index, $Q-e$. Most preferable monomers have $e$-values of less than 0.5, particularly negative $e$-values.

The group [B] monomer used in the present process is an $\alpha$-, $\beta$-, or $\alpha,\beta$-multi-substituted conjugated vinyl compound having the formula,

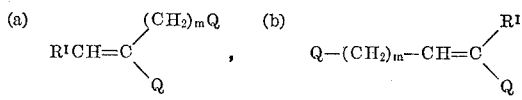

or

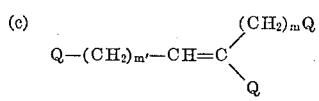

wherein Q is a nitrile group or a

group, in which $Y^I$ is ZH, $ZR^{II}$, ZMe, $NR^{III}R^{IV}$, $R^V$, a halogen atom, or a hydrogen atom, where Z is an oxygen or sulfur atom; $R^{II}$ and $R^V$ each is an organic radical having 1 to 20 carbon atoms; $R^{III}$ and $R^{IV}$ are same or different radicals selected from hydrogen atoms and organic radicals having 1 to 20 carbon atoms (including the case where $R^{III}$ and $R^{IV}$ are bonded to each other at a position other than the nitrogen atom); Me is an ammonium radical or the monovalent portion of an element of Groups I to III of Mendeleev's Periodic Table; and $m$ and $m'$ are 1 or 2.

The organic radical having 1 to 20 carbon atoms, which is represented by $R^{II}$, $R^{III}$, $R^{IV}$ or $R^V$ is preferably a common hydrocarbon radical or its inert derivative such as, for example, alkyl, alkenyl, aryl, aralkyl, alkylaryl, and cycloalkyl. The halogen used for $Y^I$ is chlorine, bromine, iodine, and fluorine. Me is an ammonium radical or the monovalent portion of an element of Groups I to III of Mendeleev's Periodic Table, such as, for example, lithium, sodium, potassium, rubidium, cesium, copper, silver, beryllium, calcium, strontium, barium, magnesium, zinc, cadmium, mercury, boron, aluminum, gallium, etc. The monovalent portion referred to herein is such that when an element of Groups I to III of Mendeleev's Periodic Table is represented by Me', Me of a divalent element is Me'/2 and that of a trivalent element is Me'/3. Specifically, the above correspond to, for example,

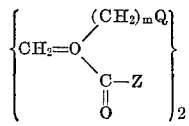

Me' in the case of a divalent element and to

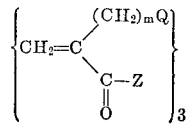

Me' in the case of a trivalent element. Of these, monovalent salts, i.e. salts of the Group I elements and ammonium salts are particularly preferable. That group $NR^{III}R^{IV}$ includes the case where $R^{III}$ and $R^{IV}$ are bonded to each other at the portion other than N means that there are included, for example, morpholino-, pyrrolidino- and piperidino-group having the formulas:

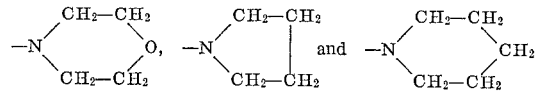

respectively.

Examples of the multi-substituted conjugated vinyl compounds are $\alpha$-, $\beta$- or $\alpha,\beta$-substituted acrylic esters, thiolacrylic esters, acrylamides, N-substituted acrylamides, N,N-disubstituted acrylamides, acryloyl halides, acrylic acid, thiolacrylic acid, acrylic salts, thiolacrylic salts, acrolein, vinyl ketones, acrylonitrile, etc. Examples of individual compounds are methyl $\beta$-cyano-$\beta$-methylenepropionate, ethyl $\beta$-cyano-$\beta$-methylenepropionate, propyl $\beta$-cyano-$\beta$-methylenepropionate, butyl $\beta$-cyano-$\beta$-methylenepropionate, benzyl $\beta$-cyano-$\beta$-methylenepropionate, phenyl $\beta$-cyano-$\beta$-methylenepropionate, monomethyl itaconate, dimethyl itaconate, monoethyl itaconate, diethyl itaconate, dipropyl itaconate, dibutyl itaconate, diphenyl itaconate, dibenzyl itaconate, itaconyl chloride, sodium itaconate, zinc itaconate, ammonium itaconate, $\alpha$-methyleneglutaronitrile, $\alpha$ - methyleneglutaroamide, N,N-dimethyl-$\alpha$-methyleneglutaroamide, dimethyl $\alpha$-methylenesuccinate, diethyl $\alpha$-methylenesuccinate, dipropyl $\alpha$-methylenesuccinate, dibutyl $\alpha$-methylenesuccinate, diphenyl $\alpha$-methylenesuccinate, dibenzyl $\alpha$-methylenesuccinate, dimethyl glutaconate, diethyl glutaconate, dipropyl glutaconate, dibutyl glutaconate, diphenyl glutaconate, dibenzyl glutaconate, methyl $\gamma$-cyanocrotonate, ethyl $\gamma$-cyanocrotonate, propyl $\gamma$-cyanocrotonate, butyl $\gamma$-cyanocrotonate, phenyl $\gamma$-cyanocrotonate, benzyl $\gamma$-cyanocrotonate, methyl $\gamma$-N,N-dimethylamidocrotonate, ethyl $\gamma$-N,N-dimethylamidocrotonate, butyl $\gamma$-N,N-dimethylamidocrotonate, phenyl $\gamma$-N,N-dimethylamidocrotonate, benzyl $\gamma$-N,N-dimethylamidocrotonate, $\beta$-cyanomethylacrylamide, $\beta$-cyanomethyl - N - methacrylamide, $\beta$-cyanomethyl-N,N-dimethylacrylamide, dimethyl $\alpha$-($\beta$-N,N-dimethylamido)ethylidenesuccinate, diethyl $\alpha$-($\beta$-N,N-dimethylamido)ethylidenesuccinate, dibutyl $\alpha$-($\beta$-N,N-dimethylamido)ethylidenesuccinate, diphenyl $\alpha$-($\beta$-N,N-dimethylamido)ethylidenesuccinate, dibenzyl $\alpha$-($\beta$-N,N-dimethylamido)ethylidenesuccinate, diethyl $\gamma$-N,N-dimethylamidosuccinate, dibutyl $\gamma$-N,N-dimethylamidosuccinate, etc.

It is, especially, preferable to use a compound substituted with a radical —$CH_2Q$ or —$(CH_2)_2Q$, where Q is selected from nitrile, carboxy, and hydrocarbyloxycarbonyl groups, in the $\alpha$-, $\beta$- or $\alpha,\beta$-position of a compound selected from the group consisting of acrylic esters, acrylic acid, acrylamides and acrylonitrile.

The group [B'] monomers used in the present invention are compounds explained in the specification of French Pat. No. 1,528,220. That is, anyone of $R^a$ and $R^b$ in the general formula

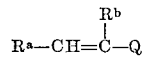

is a hydrocarbon radical, halohydrocarbon radical or a halogen atom. As the hydrocarbon radical, an alkyl, aryl, aralkyl, alkylaryl or cycloalkyl group, for instance, is frequently used. These compounds include $\alpha$-substituted and $\beta$-substituted acrylonitrile, acrylic acid, thiolacrylic acid, acrylic esters, thiolacrylic esters, acrylamides, acryloyl halides, acrolein and vinyl ketones.

The catalyst components used in the present process are (1) compounds having the formula, $MR'_nX_{3-n}$, $M'R''_3$ or $M''X'_3$, wherein M, M' and M" each are aluminum or boron, R' and R" each are common organic radicals, X and X' each are halogen atoms, and $n$ is an arbitrary value of from 1 to 2; or (2) (a') organometallic compounds of metals of Group IIb, IIIb or IVb of Mendeleev's Periodic Table, and (b') halogen compounds of metals of Group IIIb or IVb of said table. For R' and R" in the above-mentioned formulas ($MR'_nX_{3-n}$, $M'R''_3$ and $M''X'_3$) representing aluminum or boron compounds, there are used most preferably hydrocarbon radicals having 1 to 20 carbon atoms or derivatives thereof having inert substituents. Examples of such preferred radicals are alkyl, alkenyl, aryl, aralkyl, alkylaryl, cycloalkyl, etc., and more particularly methyl, ethyl, propyl, butyl, hexyl, octyl, decyl, dodecyl, stearyl, phenyl, toluyl, naphthyl, benzyl, cyclopentadienyl, cyclohexyl, etc. The halogens used for X and X' are chlorine, bromine, iodine, and fluorine. Preferred compounds are alkylaluminum dihalides, alkylaluminum sesquihalides, dialkylaluminum halides, alkylboron dihalides and dialkylboron halides.

Examples of compounds having the formula, $MR'_nX_{3-n}$, are methylaluminum dichloride, ethylaluminum dichloride, isobutylaluminum dichloride, hexylaluminum dichloride, dodecylaluminum dichloride, phenylaluminum dichloride, cyclohexylaluminum dichloride, methylaluminum dibromide, ethylaluminum dibromide, ethylaluminum diiodide, vinylaluminum dichloride, allylaluminum dichloride, ethylaluminum sesquichloride, ethylaluminum sesquibromide, ethylaluminum sesquifluoride, methylaluminum sesquichloride, ethylaluminum sesquibromide, phenylaluminum sesquiiodide, diethylaluminum chloride, diethylaluminum fluoride, ethylphenylaluminum chloride, dicyclohexylaluminum chloride, methylboron dichloride, ethylboron dichlorides, ethylboron diiodide, ethylboron difluoride, butylboron dichloride, hexylboron dichloride, dodecylboron dichloride, phenylboron dichloride, toluylboron dichloride, benzylboron dichloride, cyclohexylboron dichloride, dimethylboron chloride, diethylboron chloride, diethylboron bromide, dipropylboron chloride, dibutylboron chloride, dibenzylboron chloride, dihexylboron chloride, dioctylboron chloride, dioctadecylboron chloride, ethylvinylboron chloride, diphenylboron chloride, dicyclopentadienylboron chloride, dicyclohexylboron chloride, etc. Examples of compounds having the formula, $M'R''_3$, are trimethylaluminum, triethylaluminum, tripropylaluminum, tributylaluminum, trihexylaluminum, tridecylaluminum, triphenylaluminum, tricyclohexylaluminum, tribenzylaluminum, trimethylboron, triethylboron, tributylboron, trihexylboron, diethylphenylboron, diethyl-p-toluylboron, triphenylboron, tribenzylboron, tricyclohexylboron, etc. Examples of compounds having the formula, $M''X'_3$, are aluminum trichloride, aluminum tribromide, aluminum triiodide, partially fluorinated aluminum chloride, boron trichloride, boron trifluoride, boron tribromide, boron triiodide, etc.

Organometallic compounds of metals of Group IIb, IIIb or IVb of Mendeleev's Periodic Table, which are used as catalysts (2) in the present process, contain as the metallic constituents zinc, cadmium, mercury, boron, aluminum, potassium, indium, thallium, germanium, tin, or lead, and most preferably zinc, boron, aluminum, or tin. As the organic radicals there are used preferably common hydrocarbon radicals or derivatives thereof, most preferably, alkyl, alkenyl, aryl, aralkyl, alkylaryl, cycloalkyl groups, etc. Said organometallic compounds may contain other radicals in addition to said organic radicals, and particularly useful compounds are those having the formula, $M'''R'''_nX''_{p-n}$, wherein $M'''$ is a metal of group IIb, IIIb or IVb of Mendeleev's Periodic Table, $R'''$ is a hydrocarbon radical having 1 to 20 carbon atoms or a derivative thereof, $X''$ is a halogen atom, $p$ is the valency of the metal, and $n$ is an arbitrary number of from 1 to $p$, the most effective compounds being those in which $n$ is $p$. If required, metals of Group IIb, IIIb or IVb other than zinc, boron, aluminum, and tin may, of course, be used. Examples of useful organometallic compounds are diethyl zinc, diisobutyl zinc, ethylzine chloride, diethylcadmium, diethylmercury, diphenylmercury, trimethylboron, triethylboron, tributylboron, trihexylboron, tricyclohexylboron, triphenylboron, ethylboron dibromide, trimethylaluminum, triethylaluminum, tripropylaluminum, tributylaluminum, trihexylaluminum, tridecylaluminum, trioctadecylaluminum, triphenylaluminum, tricyclohexylaluminum, tribenzylaluminum, vinyldiethylaluminum, diethylaluminum chloride, ethylaluminum sesquichloride, ethylaluminum dichloride, diethylaluminum fluoride, trimethylgallium, triethylgallium, triphenylgallium, triethylindium, tetraethylgermanium, tetramethyltin, tetraethyltin, tetraisobutyltin, dimethyldiethyltin, ethyl-n-propyldiisopentyltin, tetraphenyltin, tetrabenzyltin, diethyldiphenyltin, triethyltin chloride, trimethyltin bromide, diethyltin dichloride, ethyltin trichloride, tetramethyllead, tetraethyllead, dimethyldiethyllead, tetraphenyllead, triethyllead chloride, etc.

The metal halides used are halides of metals of Group IIIb or IVb of Mendeleev's Periodic Table, for example, halides of boron, aluminum, gallium, indium, thallium, germanium, tin, and lead. The halogens used are chlorine, bromine, iodine, and fluorine. Said metal halides may contain other radicals in addition to halogen atoms. Particularly preferable metal halides used in the present process are those having the formula, $M''''X'''_mR''''_{q-m}$, wherein $M''''$ is a metal of Group IIIb or IVb of Mendeleev's Periodic Table, $X'''$ is a halogen atom, $R''''$ is a hydrocarbon radical having 1 to 20 carbon atoms or a derivative thereof, $q$ is the valency of the metal, and $m$ is an arbitrary value of from 1 to $q$, the most effective compounds being those in which $m$ is $q$. If required, metals of Group IIIb or IVb of Mendeleev's Periodic Table other than those mentioned above may, of course, be used. Examples of the metal halides useful in the present process are boron trichloride, boron trifluoride, boron tribromide, boron triiodide, ethylboron dichloride, phenylboron dichloride, diethylboron chloride, aluminum trichloride, aluminum tribromide, aluminum triiodide, partially fluorinated aluminum chloride, ethylaluminum dichloride, hexylaluminum dichloride, methylaluminum dibromide, ethylaluminum sesquichloride, diethylaluminum chloride, gallium trichloride, gallium dichloride, germanium tetrachloride, tin tetrachloride, tin tetrabromide, tin tetraiodide, ethyltin trichloride, methyltin trichloride, phenyltin trichloride, p-chlorophenyltin chloride, dimethyltin dibromide, diethyltin dichloride, diisobutyltin dichloride, didodecyltin dichloride, diphenyltin dichloride, trimethyltin iodide, trimethyltin fluoride, triethyltin chloride, lead tetrachloride, diethyllead dichloride, etc.

In the case where there is used as the catalyst (2) a combination of an organo-metalic compound of a metal of Group IIb, IIIb or IVb of Mendeleev's Periodic Table with a halide of a metal of Group IIIb or IVb of said table, the two compounds should not be mixed in advance. The mixing of these components is carried out in the presence of at least the group [B] monomer, or more preferably the group [B] monomer is mixed with the metal halide prior to the addition of the organometallic compound, to obtain a more desirable result.

The organic peroxides used in the present process are organic compounds having a peroxide linkage, such as, for example, diacyl peroxides, ketone peroxides, aldehyde peroxides, ether peroxides, hydroperoxides, dihydrocarbyl peroxides, esters of peracids, dihydrocarbyl percarbonates, percarbamates, etc. Examples of individual compound are benzoyl peroxide, lauroyl peroxide, caprylyl peroxide, 2,4-dichlorobenzoyl peroxide, 4-nitrobenzoyl peroxide, 4-methoxybenzoyl peroxide, 4-chlorobenzoyl peroxide, acetyl peroxide, stearoyl peroxide, phthaloyl peroxide, methyl ethyl ketone peroxide, cyclohexanone peroxide, t-butyl hydroperoxide, p-menthane hydroperoxide, diisopropylbenzene hydroperoxide, cumene hydroperoxide, di-t-butyl peroxide, dicumyl peroxide, t-butylcumyl peroxide, t-butyl perbenzoate, t-butyl perisobutyrate, t-butyl peracetate, t-butyl peroxypivalate, phenyl percarbamate, diisopropyl percarbonate, t-butyl perisopropyl carbonate, etc., though not limited to those mentioned. The accelerating effect of these peroxides on the polymerization reaction tends to be enhanced with an increase in radical decomposition rate of peroxide.

The preferable compound of a transition metal of Group IVa, Va, VIa, VIIa or VIII of Mendeleev's Periodic Table, which is used in the present process, is a compound containing at least one member selected from the group consisting of a halogen atom and alkoxy, β-diketo and acyloxy groups. These groups, i.e. alkoxy, β-diketo and acyloxy groups, have, respectively, the formulas

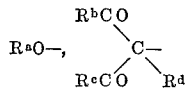

and $R^eCOO-$, wherein $R^a$, $R^b$, $R^c$, $R^d$ and $R^e$ are individually a hydrocarbon residue. The halogens are preferably chlorine, bromine and iodine. The β-diketo groups are preferably acylacetonyl groups, particularly acetylacetonyl and benzoylacetonyl groups. The hydrocarbon residues in the above-mentioned groups may be any of those having, for example, alkyl, aryl, aralkyl, alkylaryl and cycloalkyl groups, and, particularly, groups having 1 to 20 carbon atoms are preferable. Examples of the transition metal of Group IVa, Va, VIIa and VIII of Mendeleev's Periodic Table are titanium, zirconium, vanadium, chromium, molybdenum, tungsten, manganese, iron, cobalt, nickel, palladium, rhodium and platinum. Among these, titanium zirconium, vanadium, chromium, iron, cobalt and nickel are preferable, and particularly, the use of vanadium and cobalt gives favorable results. These transition metal compounds may adequately have at least one member selected from the group consisting of halogens and alkoxy, β-diketo and acyloxy groups. Alternatively, those containing said groups in admixture of two or more or in combination with other groups may also be used.

Examples of these compounds include titanium tetrachloride, titanium trichloride, di-n-ethoxytitanium dichloride, n-butyl orthotitanate, dititanium diacetylacetonate hexachloride, dicyclopentadienyltitanium dichloride, zirconium tetrachloride, zirconium tetraacetylacetonate, vanadium tetrachloride, vanadyl trichloride, triethyl orthovanadate, vanadylethoxy dichloride, vanadyldiamyloxy monochloride, vanadium trisacetylacetonate, vanadium trisbenzoylacetonate, vanadyl diacetylacetonate, vanadyl acetylacetonate dichloride, dicyclopentadienylvanadium dibromide, vanadium acetate, vanadium stearate, chromium trichloride, chromium trisacetylacetonate, manganese trisacetylacetonate, iron trichloride, iron trisacetylacetonate, cobalt dichloride, cobalt trisacetylacetonate, cobalt naphthenate, cobalt stearate, nickel dichloride, nickel diacetylacetone and nickel stearate.

In practicing the present process, the catalyst component, especially aluminum or boron compound, is used preferably in an amount of 0.001 to 10 moles, particularly 0.005 to 1.5 moles, per mole of the group [B] monomer, though may be used in any amount outside the preferred range. A desirable result may generally be obtained when the halogen-containing metal compound is used in an amount nearly equimolar to that of the group [B] monomer. A larger or smaller amount of said metal compound may, of course, be used. Generally, at lower concentrations of said metal compound, the polymerization can be carried out effectively with oxygen, an organic peroxide, or a compound of a transition metal. The advantageous effect of these compounds can distinctly be recognized at a temperature as low as −78° C. as well as at relatively low concentrations, for example, 0.001 to 20 mole percent, preferably 0.01 to 5 mole percent based on the group [B] monomer; they are, of course, effective at higher or lower concentrations.

Generally speaking, a desirable result is obtained in the case where the halogen-containing metal compound is contacted with the group [B] monomer to form a complex prior to the addition of a compound of a transition metal, oxygen, or an organic peroxide. However, depending upon conditions, monomers may be mixed together prior to the addition of catalyst components.

Although an alternating copolymer can generally be obtained regardless the monomer composition, the rate of formation, yield, the molecular weight and other properties of the polymer depend upon the ratio of the group [A] monomer to the group [B] monomer in the reacting system, so that it is preferable to choose a proper ratio of monomers according to the requirements. A desirable result may generally be obtained when the group [A] monomer is used in excess.

The polymerization temperature may arbitrarily be selected from temperatures ranging from such a low temperature as −150° C. to such a temperature as +100° C. The alternating copolymerization according to the present process proceeds rapidly even at extremely low temperatures. Since the molecular weight of the copolymer increases with the decrease of polymerization temperature, the polymerization is carried out at a temperature suitable for the required molecular weight. At lower temperatures homopolymerization proceeds more difficultly, so that lower polymerization temperatures favor the formation of purer alternating copolymer. The polymerization at room temperature or higher temperatures also proceeds effectively. The copolymerization is effected under an arbitrary pressure ranging from a reduced pressure to a pressure of up to 100 kg./cm.² Generally, the reaction proceeds easily under the atmospheric pressure.

The present process may be effected either in liquid monomers by use of the bulk polymerization technique or in the presence of common inert solvents. Examples of the inert solvents are common hydrocarbons and halogen-containing hydrocarbons such as propane, butane, pentane, hexane, heptane, octane, ligroin, petroleum ether, other petroleum mixed solvents, benzene, toluene, xylenes, cyclohexane, methylcyclohexane, methylene dichloride, ethylene dichloride, trichloroethylene, tetrachloroethylene, butyl chloride, chlorobenzene, bromobenzene, etc. As mentioned hereinbefore, compounds which form stable complexes with catalyst components are undesirable as the solvent. Particularly unsuitable compounds are those capable of forming complexes with catalyst components, which are more stable than the complexes formed from the group [B] monomer and the catalyst components.

After the completion of the polymerization reaction, after-treatments are effected according to ordinary procedures to purify and recover the polymerization product. For example, alcohol treatment, alcohol-hydrochloric acid treatment, hydrochloric acid-water treatment, alkali treatment and the like, or after-treatment procedures employed in the cationic polymerization process using Lewis acids or in the polymerization process using Ziegler-Natta catalysts may suitably be applied. It is also possible to adopt a procedure for separating and recovering the catalyst components from the polymerization products, without decomposing the catalyst components, by adding compounds capable of forming complexes therewith.

The novel alternating copolymer produced according to the present process is useful as a starting material for the production of film, fiber, and other molded articles, and as an additive for the plastics processing when proper compounds were chosen as the group [A] and [B] monomers.

The following examples illustrate the present invention in more detail, but the present invention is not limited

EXAMPLE 1

The air in a four-necked 100 ml. flask, provided with a stirrer, a thermometer, a nitrogen inlet and a dropping funnel, was replaced by nitrogen and the flask was cooled to −15° C. 57 mmol. of α-methylene-glutaronitrile and 5 ml. of a toluene solution containing 66% of ethylaluminum dichloride ($EtAlCl_2$) were introduced into the flask under a stream of nitrogen. After the addition of 10 ml. of O-di-chlorobenzene, the mixture was heated to 20° C. with good stirring. Upon addition of 58 mmol. of styrene polymerization commenced immediately. After two hours of polymerization the reaction was terminated by adding methanol acidified with hydrochloric acid, and the content of the flask was poured into a large volume of methanol. The resulting precipitates were isolated, well washed with methanol, and dried at 50° C. under vacuum to give 2.45 g. of a white solid polymer. The polymer was soluble in dimethylformamide, insoluble in acetone, methanol, or water. The intrinsic viscosity of the polymer was 0.41 dl./g., as measured in dimethylformamide solution at 30° C. The content of α-methyleneglutaronitrile in the polymer was found to be 50.8% from the result of nitrogen determination, which is in close agreement with the theoretical value (50.5%), calculated for the 1:1 alternating copolymer. The copolymer obtained had a melting point of about 205° C., and yet showed a good moldability. A series of polymerization experiments were run under the same conditions using various monomer ratios. The content of α-methylene-glutaronitrile in each copolymer obtained was found to fall within the range of 50.2 to 51.5% from the results of nitrogen determination, showing clearly the formation of 1:1 alternating copolymers. Furthermore, the nuclear magnetic resonance spectra of the copolymer obtained above were charateristic of the alternating copolymer, being distinctly different from those of the random copolymer obtained by radical polymerization.

On the other hand, the above procedure of polymerization was repeated using vinylidene cyanide instead of α-methyleneglutaronitrile, resulting in failure to cause polymerization reaction.

EXAMPLE 2

In the same flask as used in Example 1, 46 mmol. of dimethyl itaconate, 5 ml. of a toluene solution containing 23 mmol. of ethylaluminum sesquichloride ($Al_2Et_3Cl_3$) and 5 ml. of toluene as a solvent were mixed under nitrogen atmosphere at −10° C. After the addition of 46 mmol. of styrene, the mixture was heated to 15° C. with good stirring, and allowed to react for 5 hours. The reaction liquid was transferred into methanol acidified with hydrochloric acid to terminate the polymerization. The copolymer was isolated and purified in a manner similar to that in Example 1, to give 5.62 g. (yield of polymer, 46.7%) of a white solid. The infrared spectrogram of the copolymer obtained clearly showed the absorptions due to a benzene nucleus of styrene and a carbonyl group of dimethyl itaconate, and the molar ratio of styrene to dimethyl itaconate was found to be 52:48, which is in close agreement with that (50:50) of the 1:1 alternating copolymer.

EXAMPLE 3

The air in a four-necked 100 ml. flask, provided with a stirrer and a thermometer, was replaced by nitrogen and the flask was cooled to 0° C. 60 mmol. of α-methyleneglutaronitrile and 15 mmol. of ethylaluminum sesquichloride in a toluene solution (5 mol./l.) were introduced into the flask under a nitrogen atmosphere, and then 0.3 g. of benzoyl peroxide as a polymerization promoter and 10 ml. of cyclohexane as a solvent were added, and the mixture was heated to 30° C. with thorough stirring. After adding 68 mmol. of vinyl acetate, polymerizaion was allowed to proceed for 8 hours. The polymerization was terminated with methanol acidified with hydrochloric acid, and the resulting copolymer was isolated and purified to give 8 g. of a white solid with a yield of 31.1%. The content of α-methyleneglutarontrile in the copolymer was found to be 51.3 mmol. percent from the result of nitrogen determination, which is in close agreement with the theoretical value calculated for the alternating copolymer. The intrinsic viscosity of the copolymer obtained was 0.79 dl./g., as measured in dimethylformamide solution at 30° C.

EXAMPLE 4

The air in a four-necked 100 ml. flask, provided with a stirrer, was replaced by nitrogen and the flask was cooled to −78° C. 40 mmol. of methyl α-cyanoethylacrylate and 20 mmol. of tin tetrachloride in a toluene solution (10 g./100 ml.) were introduced into the flask under a nitrogen atmosphere, and mixed uniformly with stirring. After the addition of 65 mmol. of vinylidene chloride and 20 mmol. of triethylaluminum in a toluene solution (3 g./100 ml.) the mixture was heated to 0° C. while being well stirred and allowed to react for 20 hours. The polymerization was terminated by adding methanol, and the resulting polymer was isolated and purified to give 2.88 g. of copolymer with a yield of 24.3%. The intrinsic viscosity of the copolymer was 0.61 dl./g., as measured in acetone solution at 25° C. The content of vinylidene chloride in the copolymer was found to be 47.9% from the result of chlorine determination, which is in fair agreement with the theoretical value calculated for the 1:1 alternating copolymer, indicating that the copolymer obtained is mostly likely an alternating copolymer.

EXAMPLE 5

The air in a four-necked 100 ml. flask, provided with a stirrer, was replaced by nitrogen, and the flask was cooled to −78° C. 40 mmol. of dibutyl itaconate, 20 mmol. of ethylboron dichloride in a toluene solution (10 g./100 ml.), 20 mmol. of triethylboron in a toluene solution (10 g./100 ml.), and 80 mmol. of liquified butadiene were introduced under a nitrogen atmosphere, and the mixture was allowed to react for 18 hours with constant stirring. 6.82 g. of a soft solid copolymer, light yellow in color, were obtained. The intrinsic viscosity of the copolymer obtained was 0.3 dl./g., as measured in toluene solution at 30° C. The infrared absorptions of the double bond and carbonyl group in the copolymer were measured. The molar ratio of dibutyl itaconate to butadiene was calculated from said measured values to be 49:51. From the determination of carbonyl group in the hydrolyzed copolymer, the content of dibutyl itaconate was calculated to be 48.6 mole percent. These values are in good agreement with the theoretical value calculated for the alternating copolymer.

EXAMPLE 6

The air in the same flask as that used in Example 1 was replaced carefully with nitrogen. In the flask 57 mmol. of α-methyleneglutaronitrile, 5 mmol. of ethylaluminum dichloride in a toluene solution (4 g./100 ml.), and 0.25 mmol. of titanium trichloride in a toluene solution (1 g./100 ml.) as a polymerization promoter were mixed at −78° C., and the mixture was heated to 20° C. with stirring. On addition of 58 mmol. of styrene polymerization commenced immediately. After two hours the polymerization was terminated by adding methanol acidified with hydrochloric acid, and the resulting copolymer was isolated and purified to give 3.64 g. of a white solid. The intrinsic viscosity of the copolymer obtained was 0.74 dl./g., as measured in dimethylformamide solution at 30° C. The melting point of the copolymer was about 210° C., and the copolymer could be pressed to form a good film. The results of elementary analysis of the copolymer were as follows: C, 79.72%; H, 6.69%; N, 13.59%. These values were in close agreement with the theoretical values of the alternating copolymer. Theoretical: C, 79.96%; H, 6.72%; N, 13.32%.

What is claimed is:

1. An alternating copolymer composed of at least one monomer selected from the group [A] monomer consisting of (1) terminally unsaturated olefinic compounds having the formula

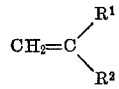

wherein $R^1$ and $R^2$ are hydrogen atoms, halogen atoms or hydrocarbon or halogen-containing hydrocarbon radicals having 1 to 20 carbon atoms, (2) internally olefinic compounds having the formula,

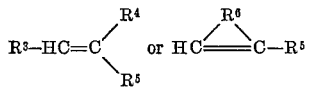

wherein $R^3$ and $R^4$ are hydrocarbon or halogen-containing hydrocarbon radicals having 1 to 20 carbon atoms; $R^5$ is a hydrogen atom or a hydrocarbon or halogen-containing hydrocarbon radical having 1 to 20 carbon atoms; $R^6$ is a divalent hydrocarbon or halogen-containing hydrocarbon radical having 1 to 20 carbon atoms, (3) polyenic compounds having up to 30 carbon atoms and containing at least one carbon-carbon double bond having at least two hydrogen atoms attached thereto, (4) acetylenic compounds having the formula,

wherein $R^7$ is a hydrogen atom, a hydrocarbon or halohydrocarbon radical having 1 to 20 carbon atoms; and $R^8$ is a hydrogen atom or a hydrocarbon or halohydrocarbon radical having 1 to 20 carbon atoms and containing a polymerizable unsaturated group, and (5) carbonyl- or thiocarbonyl-containing compounds having the formula

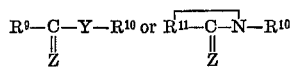

wherein $R^9$ is $R^{12}$—, $R^{12}O$—, $R^{12}S$— or $R^{13}R^{14}N$— group, Z is an oxygen or sulfur atom, Y is an oxygen atom, a sulfur atom or —$NR^{15}$ group, $R^{10}$ is a hydrocarbon or halohydrocarbon radical having 2 to 20 carbon atoms and containing a polymerizable unsaturated group, $R^{11}$ is a divalent organic radical having 1 to 20 carbon atoms, $R^{12}$ is a hydrocarbon or halohydrocarbon radical having 1 to 20 carbon atoms, and $R^{13}$, $R^{14}$ and $R^{15}$ are hydrocarbon or halohydrocarbon radicals having 1 to 20 carbon atoms, and at least one monomer selected from the group [B] monomer consisting of multi-substituted conjugated vinyl compounds having the formula,

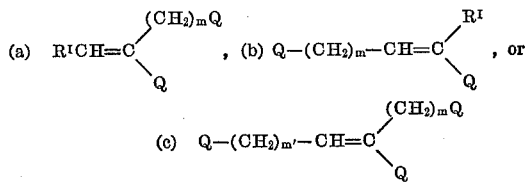

wherein $R^I$ is a hydrocarbon or halogen-containing hydrocarbon radical having 1 to 20 carbon atoms, a halogen atom or a hydrogen atom, and Q is a nitrile group or a

group, in which $Y^I$ is ZH, $ZR^{II}$, ZMe, $NR^{III}R^{IV}$, $R^V$, a halogen atom or a hydrogen atom, where Z is an oxygen or sulfur atom, $R^{II}$ and $R^V$ each is an organic radical having 1 to 20 carbon atoms, $R^{III}$ and $R^{IV}$ are hydrogen atoms or organic radicals having 1 to 20 carbon atoms (including the case where $R^{III}$ and $R^{IV}$ are bonded to each other at a position other than the nitrogen atom), Me is an ammonium radical or the monovalent portion of an element of Groups I to III of Mendeleeve's Periodic Table, and m and m' are 1 or 2; said alternating copolymer having a structure such that monomer units from group [A] always alternate with monomer units from group [B].

2. An alternating copolymer according to claim 1, wherein the group [B] monomer is an $\alpha$-, $\beta$-, or $\alpha,\beta$-substituted compound selected from the group consisting of an acrylic ester, a thiolacrylic ester, acrylamide, an N-substituted acrylamide, an N,N-disubstituted acrylamide, an acryloyl halide, acrylic acid, thioacrylic acid, an acrylic acid salt, a thiolacrylic acid salt, acrolein, a vinyl ketone and acrylonitrile.

3. An alternating copolymer according to claim 1, wherein the group [B] monomer is a compound substituted with a radical —$CH_2Q$ or —$(CH_2)_2Q$, where Q is selected from nitrile, carboxy and hydrocarbyloxy carbonyl groups, in the $\alpha$-, $\beta$- or $\alpha,\beta$-position of a compound selected from the group consisting of acrylic esters, acrylic acid, acrylamides and acrylonitrile.

4. An alternating copolymer according to claim 1, wherein the group [B] monomer is an itaconic acid monoester, an itaconic acid halide, a metal salt of itaconic acid, ammonium itaconate, $\alpha$-methyleneglutaronitrile, $\alpha$-methyleneglutaroamide, an N,N - dialkyl-$\alpha$-methyleneglutaroamide, a glutaconic acid ester, a $\gamma$-cyanocrotonic acid ester, a $\gamma$-N,N-dialkylamidocrotonic acid ester, $\beta$-cyanomethylacrylamide, a $\beta$-cyanomethyl-N-alkylacrylamide, a $\beta$-cyanomethyl-N,N-dialkylacrylamide, an $\alpha$-cyanoethylacrylic acid ester, a $\beta$-cyano-$\beta$-methylenepropionic acid ester, an $\alpha$-methylenesuccinic acid diester, an $\alpha$-($\beta$-N,N-dialkylamido)ethylidenesuccinic acid diester or a $\gamma$-N,N-dialkylamidosuccinic acid diester.

5. An alternating copolymer according to claim 1, wherein the group [B] monomer is $\alpha$-methyleneglutaronitrile, dimethyl itaconate, methyl $\alpha$-cyanoethylacrylate, or dibutyl itaconate.

6. An alternating copolymer according to claim 1, wherein the group [A] monomer is the one having e-value of less than 0.5 according to Price-Alfrey concept of monomer reactivity index, Q—e.

7. An alternating copolymer according to claim 1, wherein the group [A] monomer is selected from the group consisting of $\alpha$-olefins, styrenes, inner olefins, dienic hydrocarbons, unsaturated esters of carboxylic acids and halogen substituted compounds thereof.

8. An alternating copolymer according to claim 1, wherein the group [A] monomer is selected from the group consisting of propylene, isobutylene, styrene, butadiene, vinylidene chloride, and vinyl acetate.

9. An alternating copolymer composed of at least one monomer selected from the group [A] monomer defined in claim 1, at least one monomer selected from the group [B] monomer defined in claim 1, and at least one monomer selected from the group [B'] monomer having the formula:

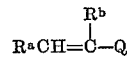

wherein $R^a$ and $R^b$ each is a hydrogen atom, a halogen atom or a hydrocarbon or halohydrocarbon radical having 1 to 20 carbon atoms, at least one of $R^a$ and $R^b$ being a hydrogen atom; and Q is a nitrile or

group, wherein Y' is a halogen atom, or a Z'R$^c$, Z'Me, NR$^d$, R$^e$ or R$^c$ group in which Z' is an oxygen atom or a sulfur atom; R$^c$, R$^d$ and R$^e$ each is a hydrogen atom or an organic radical having 1 to 20 carbon atoms, including the case where R$^d$ and R$^e$ are bonded directly to each other; and in which Me is an ammonium radical or the monovalent portion of an element of Groups I to III of Mendeleev's Periodic Table; said interpolymer having a structure such that monomer units from group [A] are linked only to the monomer units from group [B] or [B'], and monomer units from group [B] and [B'] are linked only to the monomer units from group [A].

10. A process for producing a copolymer of a multi-substituted conjugated vinyl compound and an unsaturated compound, which comprises (1) contacting at least one monomer selected from the group [A] monomers defined in claim 1, and at least one monomer selected from the group [B] monomers defined in claim 1, with an organometallic halogen compound having the formula, $$MR'_n X_{3-n}$$

wherein M is aluminum or boron, R' is an ordinary organic radical, X is a halogen atom, and $n$ is an arbitrary value of from 1 to 2, or a mixture of at least two compounds selected from the group consisting of compounds having the formulas, (a) MR'$_m$X$_{3-m}$, (b) M'R''$_3$, and (c) M''X'$_3$, wherein M, M' and M'' are aluminum or boron, R' and R'' are ordinary organic radicals, X and X' are halogen atoms, and $n$ is an arbitrary value of from 1 to 2; or (2) mixing and contacting in the presence of at least the group [B] monomer (a') an organometallic compound of a metal of Group II$b$, III$b$ or IV$b$ of Mendeleev's Periodic Table with (b') a halogen compound of a metal of Group III$b$ or IV$b$ of said Periodic Table (at least one of (a') and (b') being an aluminum compound or a boron compound), to form a complex of the conjugated monomer coordinated with an organometallic halide, and then contacting the remaining monomer with said complex.

11. A process according to claim 10, wherein the copolymerization is effected in the presence of at least one member selected from the group consisting of compounds of transition metals, oxygen, and organic peroxides.

12. A process according to claim 10, wherein the copolymerization is effected at a temperature of −150° C. to +100° C.

13. A process according to claim 10, wherein the pressure of polymerizing system is from reduced pressure to superatmospheric pressure of less than 100 kg./cm.$^2$.

14. A process according to claim 10, wherein the copolymerization is effected in an inert solvent.

15. A process according to claim 14, wherein the inert solvent is a hydrocarbon or a halogen-containing hydrocarbon.

16. A process according to claim 10, wherein the amount of catalyst components is 0.001 to 10 moles per one mole of group [B] monomer.

17. A process according to claim 11, wherein the amount of a compound of transition metal, oxygen, or an organic peroxide is 0.001 to 20 mole percent based on group [B] monomer.

References Cited

UNITED STATES PATENTS 3,278,495  10/1966  Hagel et al. _____ 260—78.5
3,492,277  1/1970   Clark _____ 260—88.1

OTHER REFERENCES

Masaaki Hirooka et al.: Alternating Copolymerization Through the Complexes of Conjugated Vinyl Monomers-Alkylaluminum Halides; Journal of Polymers Science: Part A–1, vol. 6, 1381–1396 (1968).

JOSEPH L. SCHOFER, Primary Examiner

J. KIGHT III, Assistant Examiner

U.S. Cl. X.R.

260—63 UY, 79.7, 80 M, 80.3 W, 80.72, 80.73, 80.8, 80.81, 82.5, 83.5, 85.5 P, 86.1 R, 86.7, 87.1, 87.3